United States Patent
Lee et al.

(10) Patent No.: US 7,817,238 B2
(45) Date of Patent: Oct. 19, 2010

(54) LIQUID CRYSTAL DISPLAY DEVICE AND METHOD OF MANUFACTURING THE SAME

(75) Inventors: Myoung Ho Lee, Anyang-si (KR); Min Joo Kim, Seoul (KR)

(73) Assignee: LG Display Co., ltd., Seoul (KR)

( * ) Notice: Subject to any disclaimer, the term of this patent is extended or adjusted under 35 U.S.C. 154(b) by 742 days.

(21) Appl. No.: 11/377,862

(22) Filed: Mar. 17, 2006

(65) Prior Publication Data

US 2006/0209247 A1    Sep. 21, 2006

(30) Foreign Application Priority Data

Mar. 18, 2005    (KR) ..................... 10-2005-0022704

(51) Int. Cl.
*G02F 1/1339* (2006.01)
*G02F 1/13* (2006.01)
(52) U.S. Cl. ...................................... 349/155; 349/187
(58) Field of Classification Search ......... 349/155–156, 349/123–125, 187
See application file for complete search history.

(56) References Cited

U.S. PATENT DOCUMENTS 5,437,896 A * 8/1995 Kloosterboer et al. ....... 427/515

2004/0125328 A1 * 7/2004 Chae et al. .................. 349/187

FOREIGN PATENT DOCUMENTS

| CN | 1512246 A | 7/2004 |
|---|---|---|
| CN | 1575048 A | 2/2005 |
| CN | 1683969 A | 10/2005 |
| JP | 2001-337316 | 12/2001 |
| JP | 2004-145227 | 5/2004 |

* cited by examiner

*Primary Examiner*—Dung T. Nguyen
(74) *Attorney, Agent, or Firm*—McKenna Long & Aldridge LLP

(57) ABSTRACT

A liquid crystal display (LCD) device and a method of manufacturing the same is disclosed, to improve the picture quality by preventing the movement of ball spacers from a non-pixel area to a pixel area, in which the method includes preparing a substrate including a pixel area and a non-pixel area; forming a well in a predetermined portion of the non-pixel area wherein forming the well includes coating an alignment layer on the substrate and excluding the alignment layer from a predetermined portion of the non-pixel area; and forming a ball spacer in the well using an ink-jet apparatus.

7 Claims, 5 Drawing Sheets

LIQUID CRYSTAL DISPLAY DEVICE AND METHOD OF MANUFACTURING THE SAME

This application claims the benefit of Korean Patent Application No. P2005-22704, filed on Mar. 18, 2005, which is hereby incorporated by reference for all purposes as if fully set forth herein.

BACKGROUND OF THE INVENTION

1. Field of the Invention

The present invention relates to a liquid crystal display (LCD) device, and more particularly, to a ball spacer formed between two substrates of a liquid crystal display (LCD) device to maintain a cell gap therebetween.

2. Discussion of the Related Art

Among the various types of ultra-thin flat type display devices, which include devices having display screens with a thickness of several centimeters, liquid crystal display (LCD) devices have advantages such as low power consumption and portability, and are widely used in applications such as notebook computers, monitors, and aircraft.

An LCD device includes lower and upper substrates facing each other at a predetermined interval therebetween, and a liquid crystal layer formed between the lower and upper substrates. Spacers are formed between the lower and upper substrates to maintain a cell gap therebetween.

In a related art process using sphere-shaped spacers, ball spacers are suspended in a solvent to produce a suspension solution having a predetermined density of ball spacers. The solution containing the ball spacers is sprayed onto the substrate through a nozzle.

When the solution is sprayed through the nozzle onto a substrate, the ball spacers may be sprayed onto pixel regions of the substrate where spacers are not desired, resulting in a deterioration of the picture quality of the LCD device. Accordingly, an ink-jet method has been proposed as an alternative to the solution spraying method.

FIG. 1 is a perspective view schematically illustrating a method for forming ball spacers through a related art ink-jet method.

As shown in FIG. 1, an ink-jet apparatus 30 is moved in the direction indicated by the arrow above a substrate 10 including a pixel area and a non-pixel area. While the ink-jet apparatus 30 is moving above the substrate 10, ball spacers are dispensed onto the non-pixel area of the substrate 10 by the ink-jet apparatus 30.

The ink-jet apparatus 30 comprises an ink head for storing a solution containing the ball spacers, and a nozzle for dispensing the solution containing the ball spacers onto the substrate 10.

As the ink-jet apparatus 30 moves above the substrate 10, the solution containing the ball spacers is dispensed onto the substrate 10 through the nozzle. The solution dispensed on the substrate 10 then dries. That is, the solvent evaporates from the solution, leaving the ball spacers on the substrate 10.

In the ink-jet apparatus 30 method described above, the ball spacers 50 are formed in the desired portion of the substrate by controlling the nozzle to control the dispensing of solution. Accordingly, the ball spacers 50 may be formed on the non-pixel area of the substrate 10 only, thereby preventing the deterioration of picture quality.

However, even though the ball spacers 50 are formed on the non-pixel area of the substrate 10, the ball spacers may be moved from the non-pixel area to the pixel area during a movement of the substrate 10 such as during a transfer.

In addition, when dispensing the ball spacer solution through the nozzle, the proximity of dispensed drops of the solution may allow the drops to merge producing a large drop. As the dispensed drops merge into a large drop, the ball spacers 52 may be moved onto the pixel area of the substrate 10.

As described above, even when the ball spacers are formed using the ink-jet apparatus, the ball spacers 52 may be moved to the pixel area when transferring the substrate or while dispensing the ball spacer solution, thereby deteriorating the picture quality.

SUMMARY OF THE INVENTION

Accordingly, the present invention is directed to a liquid crystal display (LCD) device which substantially obviates one or more problems due to limitations and disadvantages of the related art.

An advantage of the present invention is to provide a liquid crystal display (LCD) device that prevents the movement of ball spacers from a non-pixel area to a pixel area.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of manufacturing an LCD device includes preparing a substrate including a pixel area and a non-pixel area; forming a well in a predetermined portion of the non-pixel area including coating an alignment layer on the substrate and excluding the alignment layer from a predetermined portion of the non-pixel area; and forming a ball spacer in the well using an ink-jet apparatus.

In another aspect of the present invention, an LCD device includes first and second substrates, each substrate including a pixel area and a non-pixel area; an alignment layer having a well in the non-pixel area and formed on at least one of the first and second substrates; a ball spacer formed in the well of the alignment layer between the first and second substrates; and a liquid crystal layer formed between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, a method of manufacturing a liquid crystal display (LCD) device according to the present invention will be described with reference to the accompanying drawings.

Figure 1:
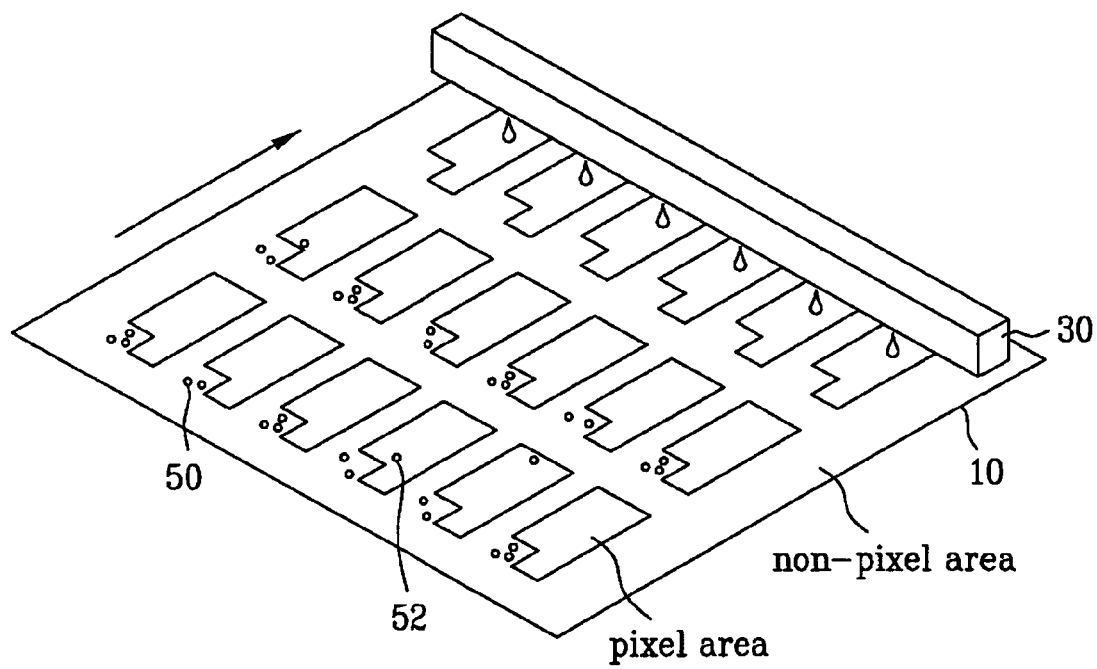
FIG. 1 is a perspective view illustrating a method for forming ball spacers by a related art ink-jet method.
Figure 2A:
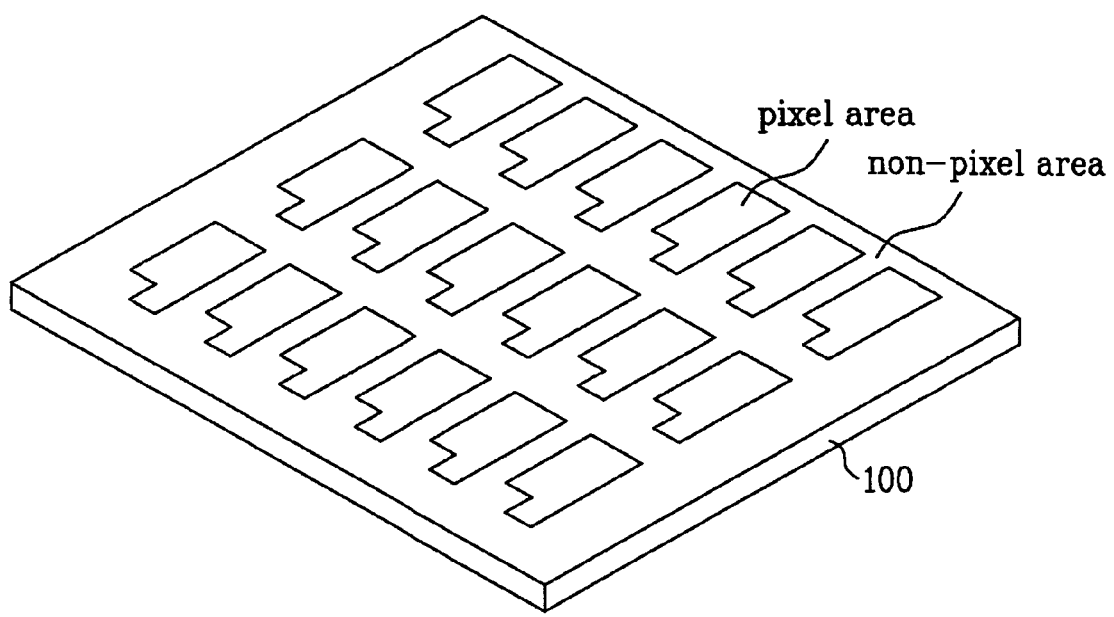
FIGS. 2A, 2B, and 2C are perspective views schematically illustrating a method for forming an LCD device according to an embodiment of the present invention.
Figure 2B:
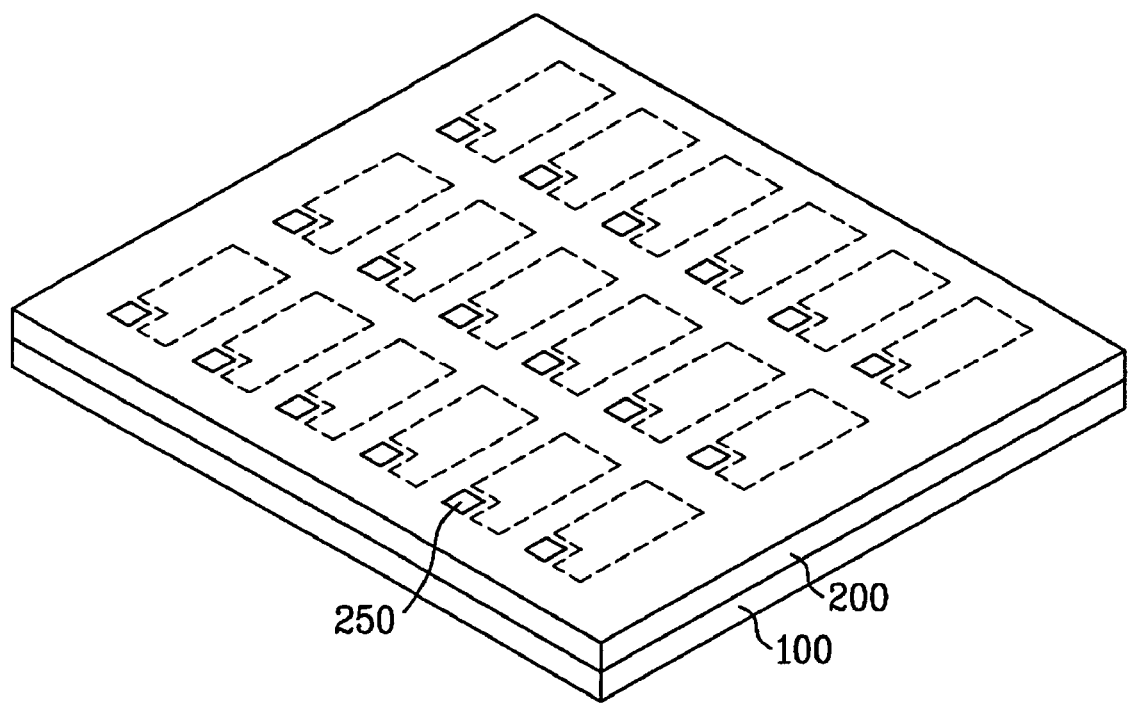
Figure 2C:
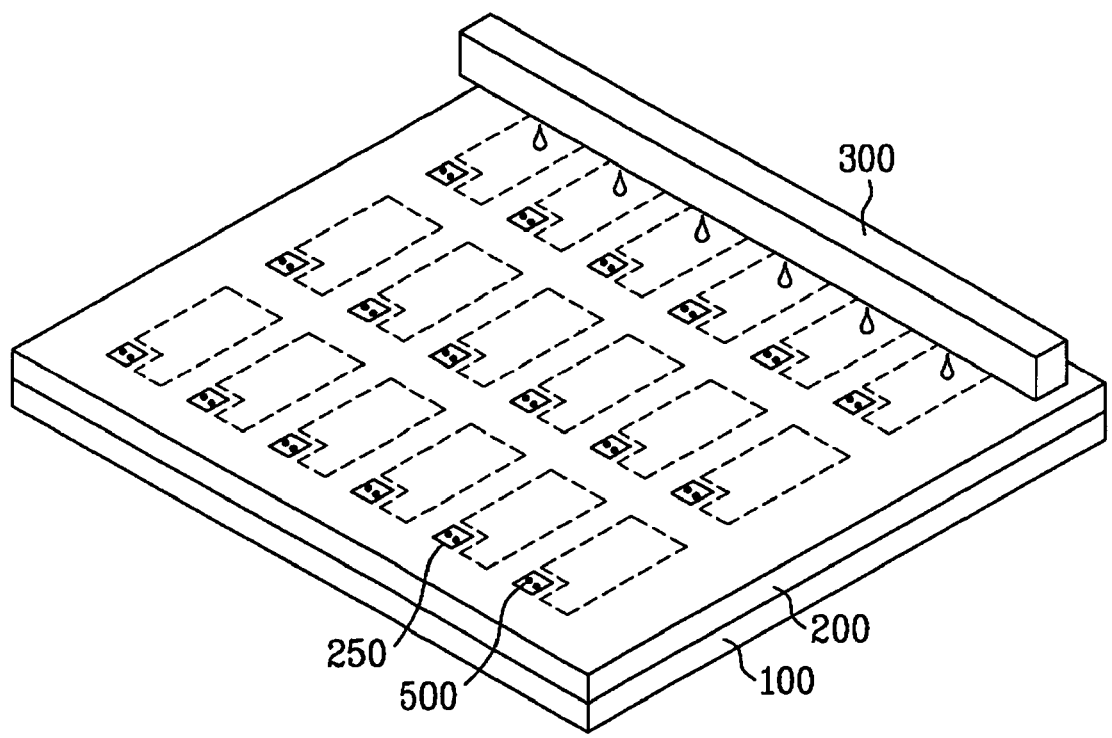

FIGS. 2A to 2C are perspective views schematically illustrating a method for forming an LCD device according to an embodiment of the present invention.

As shown in FIG. 2A, a substrate 100 including a pixel area and a non-pixel area is prepared. The substrate 100 is one of the substrates used for an LCD device, and may be a thin film transistor substrate having a thin film transistor, or a color filter substrate having a color filter layer. In either case, the elements provided on the substrate may vary depending on mode of the LCD device.

First, if the substrate 100 is a thin film transistor substrate of a TN (Twisted Nematic) mode LCD device, the elements on the substrate include gate and data lines crossing each other to define a pixel region on the transparent substrate; a thin film transistor formed at a crossing area of the gate and data lines and having a gate electrode, a source electrode and a drain electrode; and a pixel electrode formed in the pixel region and connected to the drain electrode of the thin film transistor. In this case, for example, the area in which the gate line, the data line and the thin film transistor are formed serves as a non-pixel area, while the area in which the pixel electrode is formed serves as a pixel area.

Secondly, if the substrate 100 is a thin film transistor substrate of an IPS (In-Plane Switching) mode LCD device, the elements on the substrate include gate and data lines crossing each other to define a pixel region on a transparent substrate; a thin film transistor formed at a crossing area of the gate and data lines and having a gate electrode, a source electrode and a drain electrode; a pixel electrode formed in the pixel region and connected to the drain electrode of the thin film transistor; and a common electrode formed parallel to the pixel electrode. In this case, for example, the area in which the gate line, the data line and the thin film transistor are formed serves as a non-pixel area, and the area in which the pixel electrode and the common electrode are formed serves as a pixel area.

Thirdly, if the substrate 100 is a color filter substrate of a TN mode LCD device, the elements on the substrate include a black matrix layer for preventing light leakage formed on a transparent substrate; a color filter layer of red, green and blue formed on the black matrix layer; and a common electrode formed on the color filter layer. In this case, for example, the area in which the black matrix layer is formed serves as a non-pixel area, and the area in which the color filter layer is formed serves as a pixel area.

Fourthly, if the substrate 100 is used for a color filter substrate of an IPS mode LCD device, the elements on the substrate include a black matrix layer for preventing light leakage, formed on a transparent substrate; a color filter layer of red, green and blue formed on the black matrix layer; and an overcoat layer for maintaining flatness of the substrate formed on the color filter layer. In this case, for example, the area in which the black matrix layer is formed serves as a non-pixel area, and the area in which the color filter layer is formed serves as a pixel area.

It will be apparent to one skilled in the art that the elements provided on the substrate 100 may be vary depending on the materials and formation methods employed.

As shown in FIG. 2B, an alignment layer 200 may be coated on an entire surface of the substrate 100 excluding a predetermined portion of the non-pixel area, thereby forming a well 250 in the predetermined portion of the non-pixel area. If the substrate 100 is used as the thin film transistor substrate, the well 250 may be formed in the portion corresponding to the gate line, the data line or the thin film transistor. If the substrate 100 is used as the color filter substrate, the well 250 may be formed in the portion corresponding to the black matrix layer.

The process of coating the alignment layer 200 on the substrate 100 is described below as being performed with an ink-jet apparatus. However, the invention is not limited to coating processes employing an ink-jet apparatus. The process of coating the alignment layer on the substrate may be performed with various apparatuses commonly known to those skilled in the art. For example, the alignment layer 200 may be formed using a slit-coating method. Other application methods which allow the alignment layer to be coated over the substrate and which allow the coating of the alignment layer to be excluded from a predetermined region of the substrate may be employed. When using the ink-jet apparatus, it is possible to control the coating area of the alignment layer by controlling a nozzle of the ink-jet apparatus.

After coating the alignment layer 200, an alignment process is performed on the coated alignment layer 200 to obtain an initial direction of liquid crystal. The alignment layer 200 may be formed of a material such as polyimide, polyamide-based compound, polyvinyl alcohol (PVA), polyamic acid, and a rubbing alignment process may be used to establish the initial direction of the liquid crystal. Alternatively, the alignment layer 200 may be formed of a photosensitive material such as polyvinylcinnamate (PVCN), polysiloxanecinnamate (PSCN), or cellulosecinnamate (CelCN)-based compound, and a photo-alignment process may be used to establish the initial direction of the liquid crystal.

As shown in FIG. 2C, ball spacers 500 are formed in the well 250 of the substrate 100 using an ink-jet apparatus 300. The ink-jet apparatus 300 includes an ink head for storing a solution containing the ball spacers, and a nozzle for dispensing the solution containing the ball spacers onto the substrate 100.

A solution containing the ball spacers is provided to the ink-jet apparatus 300, and the solution is dispensed to the well 250 on the substrate 100 by moving the ink-jet apparatus 300 above the substrate 100. As the dispensed solution dries, the ball spacers remain in the well 250 of the substrate 100. Instead of moving the ink-jet apparatus 300, the substrate 100 may be moved.

Although not shown in FIG. 2C, a second substrate is provided opposite to the substrate 100. A liquid crystal layer is formed between the two substrates, and the two substrates are bonded to each other to complete the LCD device.

If the substrate 100 corresponds to the thin film transistor substrate (TN mode or IPS mode), the opposite substrate corresponds to the color filter substrate (TN mode or IPS mode, respectively). If the substrate 100 corresponds to the color filter substrate (TN mode or IPS mode), the opposite substrate corresponds to the thin film transistor substrate (TN mode or IPS mode, respectively).

The liquid crystal layer may be formed using a dropping method or an injection method. In the dropping method, liquid crystal is dropped onto one of the two substrates before bonding the two substrates to each other. In the injection method, after bonding the two substrates with a sealant, liquid crystal is injected to a space between the two substrates using capillary phenomenon and a pressure differential.

An LCD device that may be manufactured using the above method will be described with reference to FIGS. 3A and 3B.

Figure 3A:
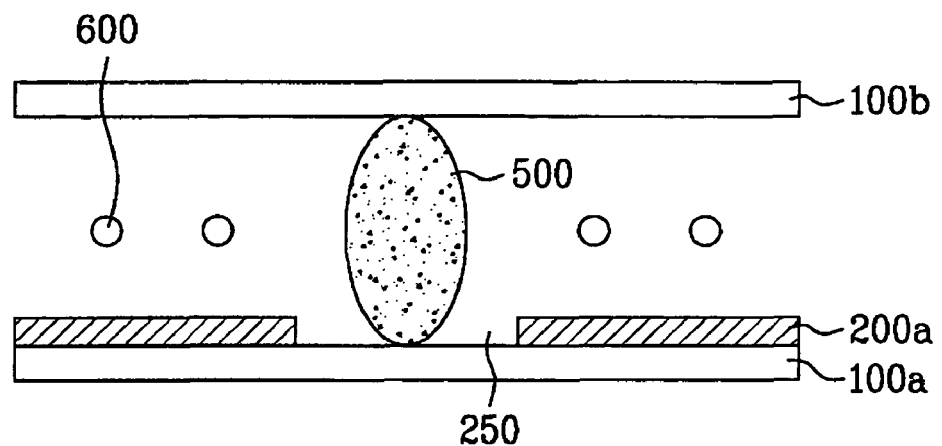
FIGS. 3A and 3B are cross sectional views showing an LCD device according to an embodiment of the present invention.
Figure 3B:
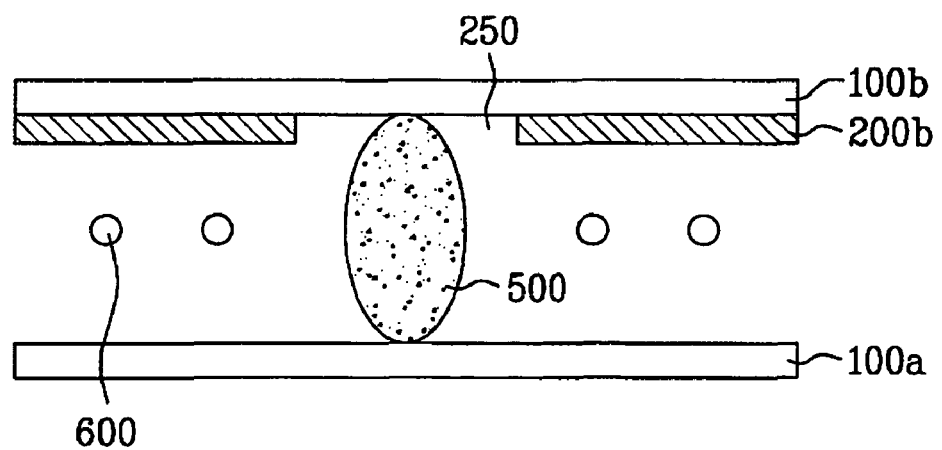

FIGS. 3A and 3B are cross sectional views illustrating an LCD device according to an embodiment of the present invention.

As shown in FIGS. 3A and 3B, the LCD device according to an embodiment of the present invention includes a first substrate 100a, a second substrate 100b, an alignment layer 200a or 200b, a ball spacer 500 and a liquid crystal layer 600.

The alignment layer 200a or 200b is formed on any one of the first and second substrates 100a and 100b. The ball spacer 500 is formed between the first and second substrates 100a and 100b, and the liquid crystal layer 600 is formed between the first and second substrates 100a and 100b.

The first substrate 100a corresponds to a thin film transistor substrate having a thin film transistor. The second substrate 100b corresponds to a color filter substrate having a color filter layer. A detailed explanation of the thin film transistor and the color filter layer will be omitted, as the details are identical to those described above.

As shown in FIGS. 3A and 3B, the alignment layer 200a or 200b may be formed on any one of the first and second substrates 100a and 100b. However, the alignment layers may be formed on both the first and second substrates 100a and 100b.

The alignment layer 200a or 200b is not formed on an entire surface of the substrate 100a or 100b. Instead, the alignment layer is formed on the substrate excluding a predetermined portion, thereby forming a well 250 having no alignment layer within the predetermined portion. As shown in FIG. 3A, if the well 250 is formed on the thin film transistor substrate 100a, the well 250 may be formed in an area corresponding to a gate line, a data line or a thin film transistor. Referring to FIG. 3B, if the well 250 is formed on the color filter substrate 100b, the well 250 may be formed in an area corresponding to a black matrix layer. In either case, the well 250 is formed in a non-pixel area of the substrate 100a or 100b.

Because the ball spacer 500 is formed in the well 250 in a non-pixel area the ball spacer 500 is prevented from moving to a pixel area.

As mentioned above, the LCD device according to the present invention has the following advantages.

When forming the alignment layer of the LCD device according to the present invention, a well is formed in a predetermined portion of the non-pixel area using an apparatus such as an ink-jet apparatus, and a ball spacer is formed in the well in the non-pixel area. Accordingly, it is possible to improve the picture quality by preventing the ball spacer from moving to the pixel area.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of manufacturing a liquid crystal display device comprising:
    preparing a first substrate including a pixel area and a non-pixel area, wherein preparing the first substrate includes: forming gate and data lines on the first substrate, the gate and data lines crossing each other to define a unit pixel region; forming a thin film transistor at a crossing area of the gate and data lines, the thin film transistor including a gate electrode, a source electrode and a drain electrode; and forming a pixel electrode connected with the drain electrode of the thin film transistor;
    forming a well corresponding to the thin film transistor of the non-pixel area wherein forming the well includes: coating an alignment layer on the first substrate, and excluding the alignment layer from the thin film transistor of the non-pixel area; and
    forming a ball spacer in the well to prevent the balls spacer from moving to the pixel area using an ink-jet apparatus, wherein forming the ball spacer in the well using the ink-jet apparatus includes: supplying a solution containing the ball spacer as solid state to the ink-jet apparatus; dispensing the solution onto a predetermined portion of the first substrate by moving the ink-jet apparatus above the first substrate; and drying the solution containing the ball spacer to remove a solvent of the solution from the first substrate.

2. The method of claim 1, further comprising a second substrate having a pixel area and a non-pixel area includes:
    forming a black matrix layer on the non-pixel area of the second substrate to prevent light leakage; and
    forming a color filter layer of green, red and blue on the second substrate including the black matrix layer.

3. The method of claim 2, further comprising:
    forming a liquid crystal layer between the first substrate and the second substrate; and
    bonding the first and second substrates to each other.

4. The method of claim 3, wherein forming the liquid crystal layer includes:
    dropping liquid crystal onto any one of the first substrate and the second substrate before bonding the first and second substrates to each other.

5. The method of claim 3, wherein forming the liquid crystal layer includes:
    injecting liquid crystal to a space between the first and second substrates after bonding the first and second substrates to each other.

6. The method of claim 1, wherein the coating the alignment layer is performed using an ink-jet apparatus.

7. The method of claim 6, wherein excluding the alignment layer from a predetermined portion of the non-pixel area includes:
    controlling a nozzle of the ink-jet apparatus.

* * * * *